Patented Sept. 26, 1922.

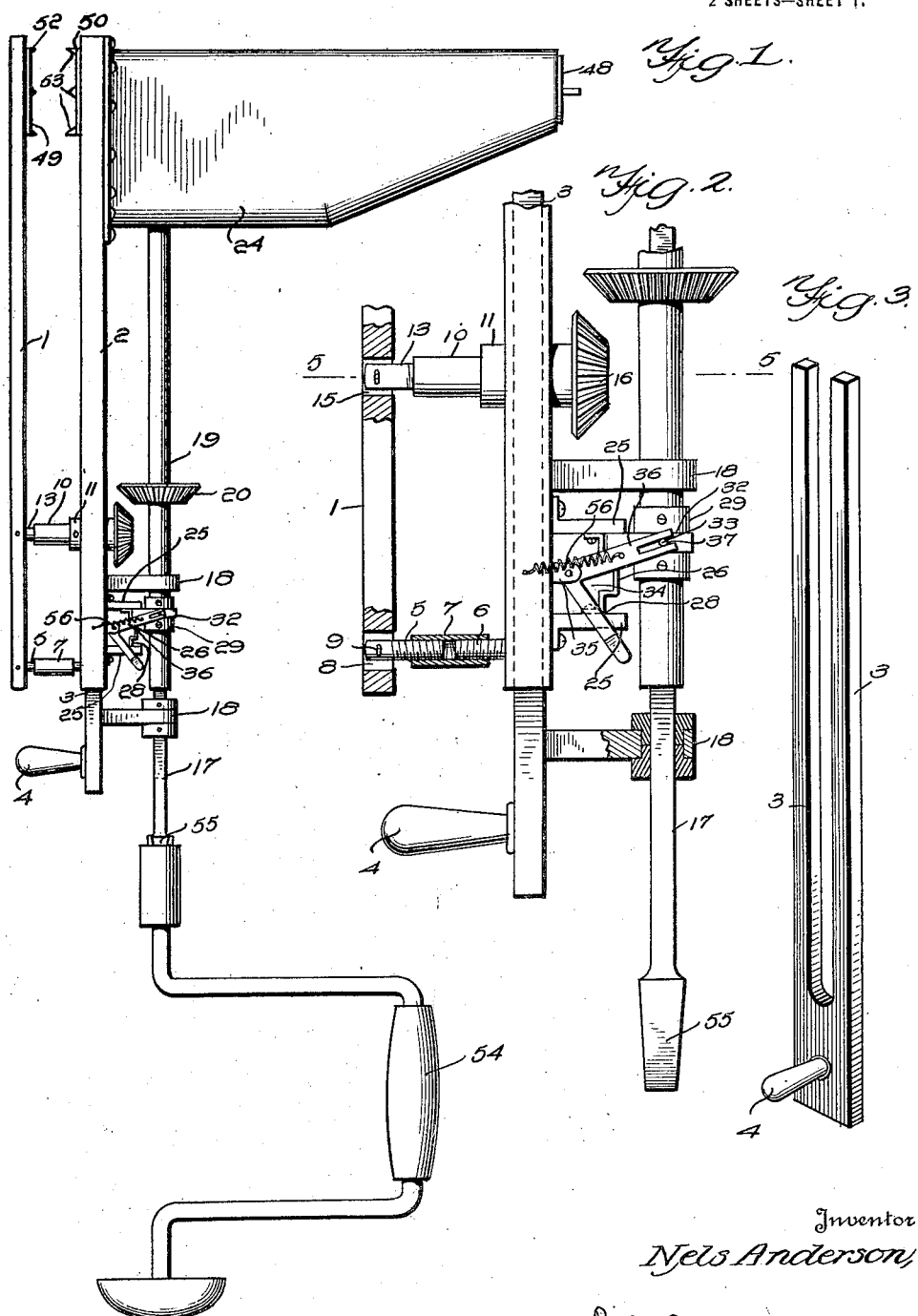

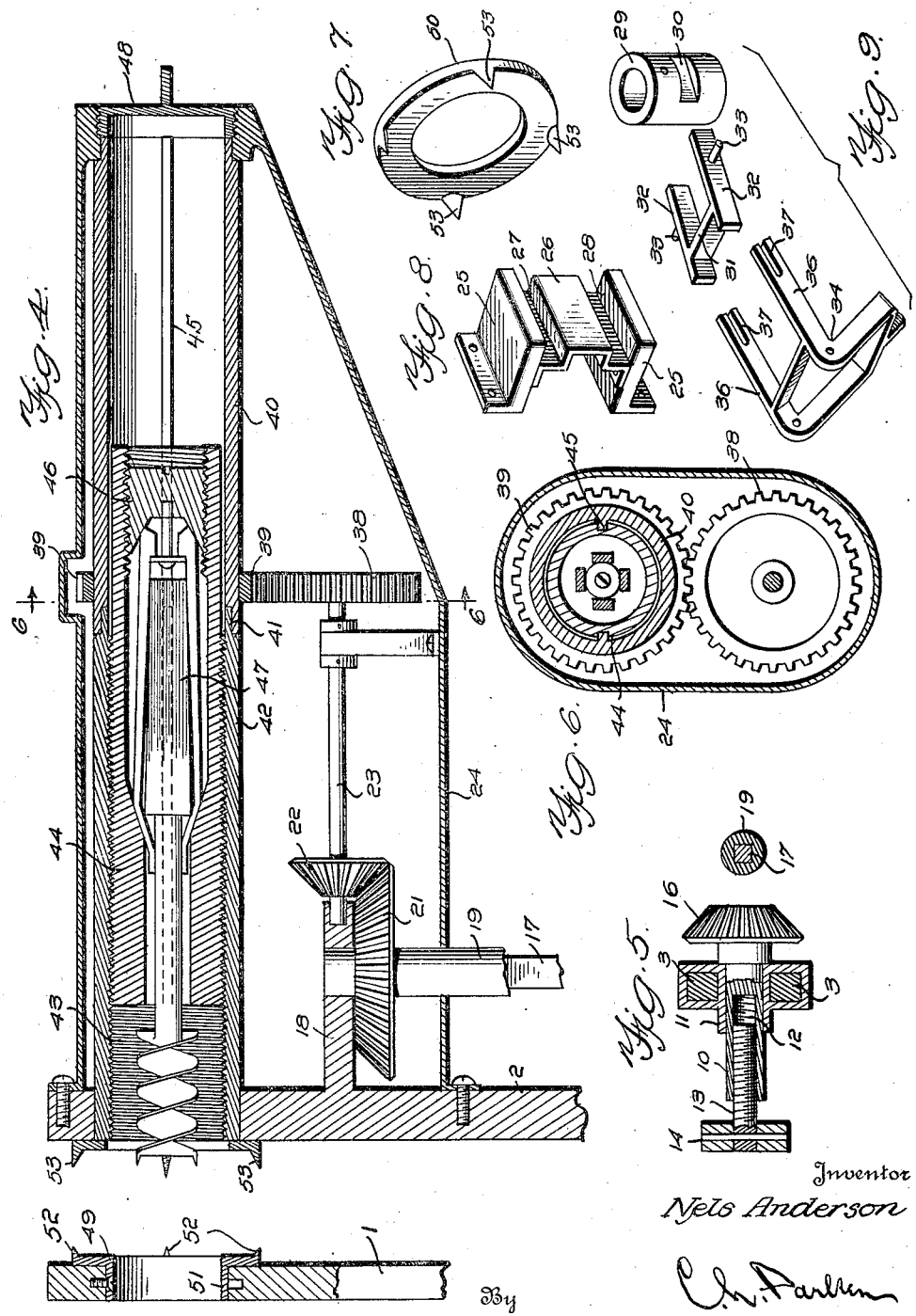

1,429,916

UNITED STATES PATENT OFFICE.

NELS ANDERSON, OF FLINT, MICHIGAN.

BORING MACHINE.

Application filed July 21, 1921. Serial No. 486,641.

*To all whom it may concern:*

Be it known that I, NELS ANDERSON, a subject of the King of Sweden, residing at Flint, in the county of Genesee and State of Michigan, have invented certain new and useful Improvements in Boring Machines, of which the following is a specification.

This invention relates to boring machines, and it comprises a clamp or work holder, a shaft supported in bearings, carried by said work holder, a threaded tool supporting member, a bit holder mounted therein, said bit holder being threaded to engage the threads of the supporting member, and connecting means between said shaft and said bit holder.

An object of the invention is the provision of a work holder, a drive shaft arranged substantially parallel to the work holder, and a cutting tool arranged at right angles thereto and connected to the shaft.

A further object of the invention is the provision of a housing for the cutting tool which will project or withdraw the cutting tool when the cutting tool is rotated.

A further object of the present invention is the provision of means operable by the main shaft for clamping the work in the work holder.

In the accompanying drawings, I have shown one embodiment of the invention. In this showing:

Figure 1 is a side elevation,

Figure 2 is a similar view of a portion of the mechanism on an enlarged scale,

Figure 3 is a detail perspective view of a portion of the work holder,

Figure 4 is a central vertical sectional view through the tool housing and associated parts, Figure 5 is a detail transverse sectional view on line 5—5 of Figure 2, Figure 6 is a vertical sectional view on line 6—6 of Figure 4, Figure 7 is a detail perspective view of a clamping element, Figure 8 is a similar view of a portion of the control mechanism, and, Figure 9 is a similar view of another portion of the control mechanism, Referring to the drawings, the reference numerals 1 and 2 designate a pair of beams adapted to form the work holder. Beam 2 is hollow and is adapted to receive an extension member 3 having a handle 4 on one end. The beams are connected to each other at their lower ends by means of a pair of oppositely threaded rods 5 and 6, and a sleeve 7 forming a turn-buckle. As shown, the rod 5 is mounted in a slot 8 in the beam 1 and supported on a pin 9. The beams are further connected by means of a hollow shaft 10 passing through a bearing 11 in the beam 2 and provided with internal threads 12. A threaded rod 13 is mounted on a pin 14 arranged in a slot 15 of the beam 1. The hollow shaft is provided with a bevel gear 16 arranged on the opposite end. The main shaft 17 is supported in bearings 18, carried by the beam 2. As shown, the shaft is square in cross section except at the points where it is passed through the bearings and is adapted to be surrounded by a hollow shaft 19 having a squared opening whereby the shaft 19 is slidably mounted on the shaft 17 and adapted to turn therewith. The shaft 19 is provided with a bevel gear 20, meshing with the gear 16 and is further provided with a bevel gear 21 arranged on its upper end. The gear 21 is adapted to mesh with a bevel gear 22, mounted on a shaft 23 within a housing 24. The gears 20 and 21 are spaced on the shaft 19 so that only one of them can be in mesh with its corresponding gear at one time. The gears are moved into and out of mesh by sliding the shaft 19 on the shaft 17. The gears are locked in the desired position by means of a locking mechanism shown in Figures 8 and 9 of the drawings. As shown, a pair of plates 25 are secured to the beam 2 and spaced from each other. A plate 26 is arranged between these plates, the plate 26 being provided with a pair of grooves 27 and 28. A collar 29 is secured to the shaft 19, and this collar is provided with a pair of notches 30, arranged on opposite sides. A slidable member 31 is provided with arms 32 adapted to ride in the slots 30. As shown, the slidable member is provided with pins 33 projecting therefrom. A locking dog 34 is pivotally mounted in a pair of ears 35, carried by the beam 2, and this dog is provided with a pair of arms 36 having slots 37 arranged on their outer ends adapted to receive the pins 33. The inner ends of the arms 32 of the slidable member are adapted to enter the groove 28.

The housing 24 extends at substantially right angles to the beams 1 and 2 and is adapted to form a support for the cutting tool. As shown, the shaft 23 is provided with a gear 38, adapted to mesh with a ring gear 39 carried by a tube 40. The tube extends from the outer end of the casing to a point intermediate its ends and is provided with a tongue and groove fitting 41 connecting it to a tube 42. The tube 40 is adapted to revolve by the revolution of the ring gear while the tube 42 is rigidly mounted in the housing. The tube 42 is provided with internal threads 43 adapted to mesh with external threads formed on a tool supporting member 44. The tool supporting member extends into the revolving tube 40 and is provided with grooves adapted to receive lugs 45 carried by the revolving tube. A block 46 is arranged within the tool supporting member and is adapted to receive a cutting bit 47. As shown, the outer end of the tube 40 is provided with a threaded cap 48 to permit access to the interior.

The beams 1 and 2 are provided with openings in alinement with the cutting tool and a pair of clamping elements 49 and 50 are arranged over these openings. The clamping element 49 is provided with a flange 51 extending into the opening in the beam 1, and is further provided with teeth 52 formed on its face and adapted to engage the work. The clamp 50 is similarly provided with teeth 53.

The lower end of the shaft 17 is shaped to fit a brace 54, as shown at 55.

The operation of the device is as follows:

The appliance is used for boring holes in beams and similar work and is especially adapted for use in electric wiring. It insures a hole cut straight through the material worked on and can be swung to various positions about the axis of the cutting tool for convenience in operation. The beam or other piece of work to be cut is arranged between the supporting beams 1 and 2 and gears 16 and 20 are brought into mesh with each other by arranging the ends of arms 32 in the lower groove 28. The gears 21 and 22 are then out of mesh so that the cutting tool will not be operated. By turning the shaft, the rod 13 is fed into the hollow shaft 10, drawing the beams toward each other. The sleeve 7 is turned to tighten the lower end of the beams and the work is clamped between the clamps 49 and 50. When the work has been properly positioned, the dog 34 is swung on its pivot to move the slidable member outwardly and disengage it from the groove 28. The shaft is then moved upwardly and the arms 32 seated in groove 27. A spring 56 may be secured to the dog for the purpose of automatically returning the parts to locked position. When the shaft is moved upwardly, gears 21 and 22 are brought into mesh and revolution of the handle revolves the shaft 23 and the gear 38. The revolving tube 40 is thus revolved through the ring gear 39 and the tool holder 44 revolves therewith. The revolution of the tool holder causes the tool to be projected or withdrawn due to the threads formed thereon engaging the threads 43 of the stationary tube 42.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A boring device comprising a clamping element, formed of a pair of spaced members, a drive shaft supported by one of said members, disengageable means driven by said shaft to move said members toward and away from each other, a boring tool mounted at an angle to said members, and disengageable connecting means between said tool and said shaft to drive said tool.

2. A boring device comprising a clamping element formed of two spaced members, a main shaft supported on one of said members, a hollow shaft having internal threads carried by one of said members, a threaded rod secured to the other member and adapted to engage the threads of said shaft, disengageable gearing connecting said hollow shaft to said main shaft, a boring tool arranged at an angle to said clamping element, and disengageable gearing connecting said boring tool to said main shaft to drive said tool.

3. A boring device comprising a clamping element formed of two spaced members, a main shaft supported on one of said members, a hollow shaft having internal threads carried by one of said members, a threaded rod secured to the other member and adapted to engage the threads of said shaft, gearing connecting said hollow shaft to said main shaft, a boring tool arranged at an angle to said clamping element, gearing connecting said boring tool to said main shaft to drive said tool, the gearing between the hollow shaft and the main shaft being out of mesh when the gearing between the main shaft and the tool is in mesh, and locking means to retain the gearing in either position.

4. A boring device comprising a clamping element formed of two spaced members, a shaft supported on one of said members, a sleeve slidable on said shaft and adapted to rotate therewith, a pair of bevel gears carried by said sleeve, a boring tool supported by said clamping element, operating means including a bevel pinion adapted to mesh with one of said gears for moving the spaced members of said clamping element toward and away from each other, operating means including a bevel pinion adapted to mesh with the other of said gears for rotating said boring tool, and means for shifting said sleeve to selectively engage said gears with their corresponding pinions.

5. A boring device comprising a clamping element formed of two spaced members, a shaft supported by one of said members, a sleeve slidable on said shaft and rotatable therewith, a pair of bevel gears carried by said sleeve, a hollow shaft having internal threads carried by one of said members, a threaded rod secured to the other member and adapted to engage the threads of said shaft, a bevel pinion secured to said hollow shaft and adapted to mesh with one of said bevel gears, a boring tool mounted transversely of said clamping element, means for rotating said tool including a bevel pinion adapted to mesh with the other of said gears, means for shifting said sleeve to selectively engage said gears with their corresponding pinions, and means for retaining said sleeve in either position.

In testimony whereof I affix my signature in presence of two witnesses.

NELS ANDERSON.

Witnesses:
PAUL V. GADOLA,
GUNNARD E. PEARSON.